(12) United States Patent
Liu

(10) Patent No.: US 10,525,604 B2
(45) Date of Patent: Jan. 7, 2020

(54) LINEAR ACTUATOR-TYPE AUTOMATIC WAREHOUSE ROBOT

(71) Applicant: ZHUINENG ROBOTICS (SHANGHAI) CO., LTD, Shanghai (CN)

(72) Inventor: Zhe Liu, Zhejiang (CN)

(73) Assignee: ZHUINENG ROBOTICS (SHANGHAI) CO., LTD, Shanghai (CN)

( * ) Notice: Subject to any disclaimer, the term of this patent is extended or adjusted under 35 U.S.C. 154(b) by 116 days.

(21) Appl. No.: 15/812,857

(22) Filed: Nov. 14, 2017

(65) Prior Publication Data

US 2018/0065258 A1    Mar. 8, 2018

Related U.S. Application Data

(63) Continuation of application No. PCT/CN2016/108383, filed on Dec. 2, 2016.

(30) Foreign Application Priority Data

Jun. 13, 2016 (CN) .......................... 2016 1 0410848

(51) Int. Cl.
   *B25J 19/02*     (2006.01)
   *B25J 5/00*      (2006.01)
   (Continued)

(52) U.S. Cl.
   CPC ............. *B25J 19/023* (2013.01); *B25J 5/007* (2013.01); *B25J 19/005* (2013.01); *B25J 19/04* (2013.01);
   (Continued)

(58) Field of Classification Search
   CPC .................................................. B25J 19/023
   See application file for complete search history.

(56) References Cited

U.S. PATENT DOCUMENTS 3,024,738 A  *  3/1962  O'Toole ................. A47F 5/025
                                                   104/44
5,163,001 A  * 11/1992  Luke, Jr. .......... G05B 19/41895
                                                   180/169
(Continued)

FOREIGN PATENT DOCUMENTS

| CN | 102633077 A | 8/2012 |
| CN | 202518714 U | 11/2012 |

(Continued)

OTHER PUBLICATIONS

CN104129591A_machine_translation.pdf (Year: 2014).*

*Primary Examiner* — Michael S Lowe
(74) *Attorney, Agent, or Firm* — Hamre, Schumann, Mueller & Larson, P.C.

(57) ABSTRACT

An electric pole-type automatic warehouse robot comprises a frame; mecanum wheels and drive wheels provided at a bottom of the frame, with the mecanum wheels being located at four corners thereof and the drive wheels being located at the middle of tow opposite sides thereof; a drive motor provided on the frame and connected to the drive wheels; a barrier module provided at a head of the frame; a rotating pallet module provided at an upper portion of the frame; a rotating motor provided within the rotating pallet module; electric poles provided on the frame and located at a bottom of the rotating pallet module; a hole provided in the frame; a first camera arranged above the hole; a second camera arranged below the hole. The robot provides an automatic operation mode with simplified mechanism design of robot, so as to increase the reliability, load-bearing capacity, running speed and security of the robot.

3 Claims, 3 Drawing Sheets

(51) Int. Cl.
  *B25J 19/00* (2006.01)
  *B25J 19/04* (2006.01)
  *F16P 3/00* (2006.01)
  *B25J 9/16* (2006.01)
  *G05D 1/02* (2006.01)

(52) U.S. Cl.
  CPC ............ *F16P 3/003* (2013.01); *B25J 9/1664* (2013.01); *B25J 9/1697* (2013.01); *G05D 1/0225* (2013.01); *G05D 2201/0216* (2013.01)

(56) References Cited

U.S. PATENT DOCUMENTS

| | | | | |
|---|---|---|---|---|
| 8,874,324 | B2* | 10/2014 | Eggers | B60R 13/07 296/146.4 |
| 9,317,037 | B2* | 4/2016 | Byford | G05D 1/0231 |
| 9,579,795 | B2* | 2/2017 | Kokubo | B25J 9/1666 |
| 9,758,305 | B2* | 9/2017 | Johnson | B65G 1/1378 |
| 2006/0184013 | A1* | 8/2006 | Emanuel | G01S 5/16 600/426 |
| 2013/0166105 | A1* | 6/2013 | Wastel | E04H 6/24 701/2 |
| 2016/0132059 | A1* | 5/2016 | Mason | G05D 1/0246 701/28 |
| 2018/0194459 | A1* | 7/2018 | Zhang | B64C 25/22 |

FOREIGN PATENT DOCUMENTS

| | | |
|---|---|---|
| CN | 202642616 U | 1/2013 |
| CN | 103144094 A | 6/2013 |
| CN | 104129591 A | 11/2014 |
| CN | 204748607 U | 11/2015 |
| CN | 205170289 U | 4/2016 |
| CN | 105598940 A | 5/2016 |
| CN | 205397170 U | 7/2016 |
| CN | 106002917 A | 10/2016 |
| CN | 106219124 A | 12/2016 |
| CN | 206447087 U | 8/2017 |
| JP | 5110583 B2 | 12/2012 |
| KR | 20140046851 A | 4/2014 |

* cited by examiner

LINEAR ACTUATOR-TYPE AUTOMATIC WAREHOUSE ROBOT

TECHNICAL FIELD

This disclosure relates to robot technology, and more particularly to a linear actuator-type automatic warehouse robot.

BACKGROUND ART

Generally, the traditional warehouse delivery is operated manually, that is, a cart loading with goods is put into the warehouse by a warehouse staff, and then the goods are transported to the corresponding positions of corresponding shelves in sequence. This is time consuming and requires high labor costs, and produces huge potential security problems due to the movement of workers in the warehouse. In addition, the operation becomes more complicated and error-prone when a variety of goods (i.e. the number of stock keeping unit (SKU) is large) are stored in the warehouse.

In order to optimize the delivery operation for warehouse, many attempts have been made to realize automation of warehouse, including the implementation of automatic guided vehicle (AGV), so as to achieve an automatic mode, that is, a robot enters into the storage area, searches for the shelves as required and delivers the products to the sorting station to complete the delivery operation. Existing automatic guided vehicle performs the functions of lifting and lowering using motor and large screw cylinder.

However, such apparatus usually results in the following problems: low electrical efficiency in lifting, leading to limited capability; complicated structures, rendering high manufacturing costs; large screw cylinder being wear-prone, leading to low reliability. During the lifting, lowering and steering, the synchronization of rotations of cart body and large screw cylinder is required, and algorithms for such operation are complicated and less stable. There is provided an improved embodiment: balls are incorporated into the screw cylinder to reduce friction and to improve motor efficiency, however, the manufacturing costs thereof are increased significantly.

SUMMARY

This disclosure aims to provide an automatic operation mode with simplified mechanism design of robot, so as to increase the reliability, load-bearing capacity, running speed and security of the robot.

The technical solution solving the technical problems above is as follows.

The present application provides a linear actuator-type automatic warehouse robot, comprising: a frame; universal wheels 101 and driving wheels 102 provided at a bottom of the frame, with the universal wheels 101 being located at four corners of the bottom of the frame and the driving wheels 102 being located at the middle of two opposite sides of the bottom of the frame; driving motors 201 provided on the frame and connected to the driving wheels 102, respectively; a barrier module 104 provided at a head of the frame; a rotating pallet module 103 provided at an upper portion of the frame; a rotating motor 306 and a pallet 107 provided within the rotating pallet module 103; linear actuators 202 provided on the frame and located at a bottom of the rotating pallet module 103; an upper hole 103a provided on the rotating pallet module (103) and a lower hole 203 provided on a base plate 305; an upper camera 303 arranged below the upper hole 103a; a lower camera 304 arranged above the hole 203; and a power supply unit 204 provided in the frame.

Preferably, an emergency switch 105 is provided on the head of the frame.

Preferably, the power supply unit is an automatic charging module.

The transport robot provided by this disclosure achieves the automatic warehousing operation by utilizing a camera, QR code, an automatic charging module, a barrier module, so as to improve the efficiency of the basic operation in the warehouse. By using the linear actuators, the lifting and lowering actions by robot are simplified, and the movements of robot and shelves are separated, and thus simplifying the control and improving the reliability and operating speed. The rotating pallet module is used to separate the rotational movements of the robot and the shelves, such that the shelves remain stationary relative to the ground when the robot is rotating; or the shelves is rotated when the robot remains stationary. In this way, the movement of robot can be simplified, leading to improvement of the efficiency and the reliability for handling shelves.

The objective, functional features and advantages of this disclosure will be further described in the preferred embodiments, with reference to the accompanying drawings.

DETAILED DESCRIPTION

Hereinafter, this technology will now be described in detail in combination with the embodiments and drawings for better understanding the objective, technical solutions and advantages of the present invention. It should be understood that the embodiments described herein are to be considered as illustrative and not limitative.

Figure 1:
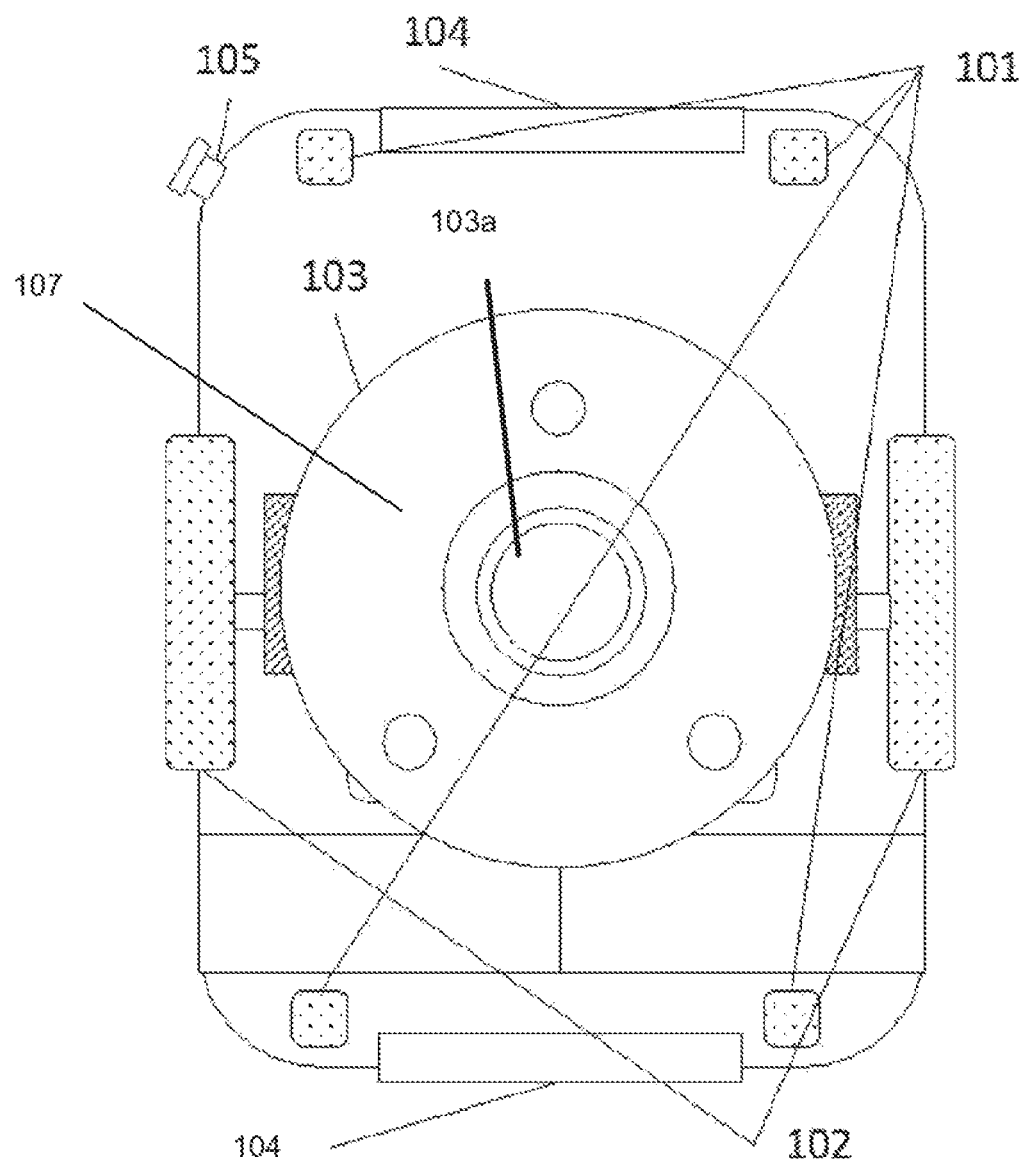
FIG. 1 is a top view of a robot according to an embodiment of the disclosure.
Figure 2:
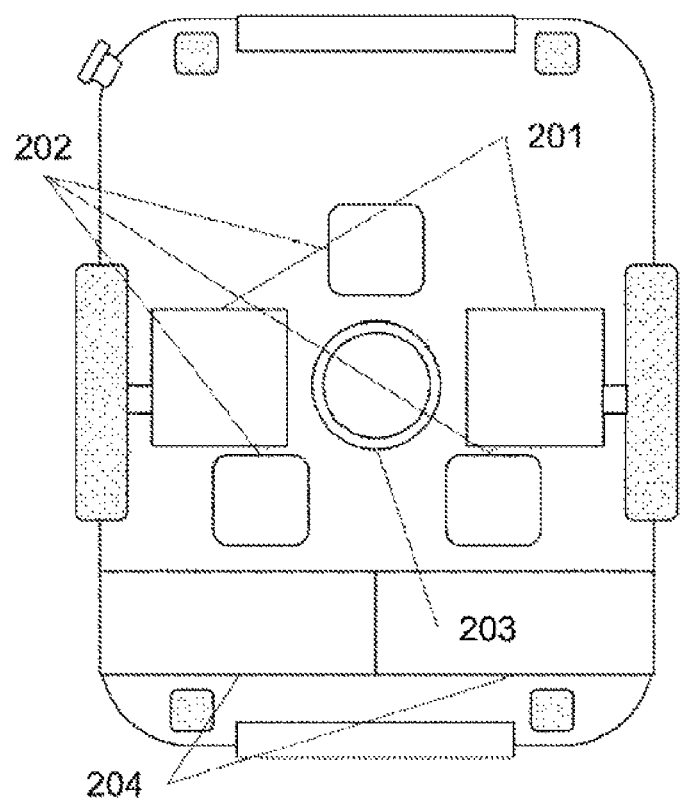
FIG. 2 is a bottom view of a robot according to an embodiment of the disclosure.
Figure 3:
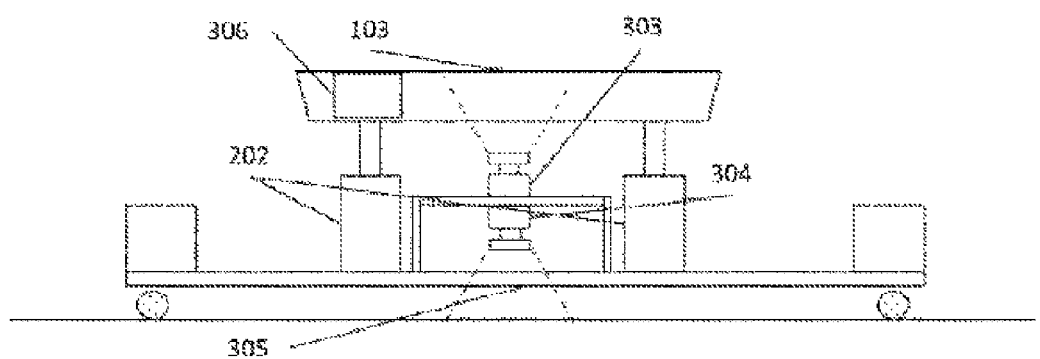
FIG. 3 is a side view of a robot according to an embodiment of the disclosure.

The embodiment of this disclosure provides a linear actuator-type automatic warehouse robot, as shown in FIGS. 1, 2 and 3, comprising a frame; universal wheels 101 and driving wheels 102 provided at a bottom of the frame, with the universal wheels 101 being located at four corners of the bottom of the frame, and the driving wheels 102 being located at the middle of two opposite sides of the bottom of the frame; driving motors 201 provided on the frame and connected to the driving wheels 102, respectively; a barrier module 104 provided at a head of the frame; a rotating pallet module 103 provided at an upper portion of the frame; a rotating motor 306 and a pallet 107 provided within the rotating pallet module 103; linear actuators 202 provided on the frame and located at a bottom of the rotating pallet module 103; an upper hole 103a provided in the rotating pallet module 103, as seen in FIG. 1; a lower hole 203 provided in a base plate 305; an upper camera 303 arranged below the upper hole 103a; a lower camera 304 arranged above the lower hole 203; and a power supply unit 204 provided in the frame.

As shown in the figures, there are four universal wheels with spring damping structures for load bearing and balancing the robot. The two driving wheels 102 are controlled by the driving motor 201 to drive the robot to move in the warehouse. The annular rotating pallet module 103 is driven by the motor to go up and down, such that the shelves are lifted up and down. The barrier module 104 having laser radar and ultrasonic radar is arranged at the head of the frame, and implements emergency stop when a barrier is present in the front. The emergency switch 105 is also arranged at the head of the frame to respond to exceptional circumstances, facilitating emergency stop by an operator; further, this emergency switch may be positioned on either the left side or right side of the head of the frame, and typically on the left side as most operators are right handed. The automatic charging module located at an end portion of the frame enables the robot to move to the charging station for automatic charging, allowing for fully automatic operation of the robot in the warehouse.

The annular rotating pallet module 103 is supported by, for example (but not limited to) three linear actuators 202, and moving up and down of the linear actuators 202 may lift and lower the annular rotating pallet module, such that the shelves may be lifted up and down. The annular rotating pallet module 103 is driven by the rotating motor 306 provided within it to rotate, which consequently allows for the clockwise and counterclockwise rotations of the shelves supported by the pallet module 103. The two driving wheels are connected to the two driving motors 201, respectively, and the two driving motors are controlled by a controller to perform synchronous or asynchronous rotations, allowing for moving forward and backward and turning of the robot. Upon lifting the shelves by the linear actuators, the rotating motor is controlled though the controller to enable the shelves to rotate independently of the rotation of the robot; when the rotating motor is used with the two driving motors, the robot and the shelves may rotate in three modes involving synchronous or asynchronous rotation: (i) the robot is rotating, while the shelves remain stationary; (ii) the shelves are rotating, while the robot remains stationary; (iii) the robot drives the shelves to rotate together. The linear actuators 202, the driving motors 201 and the rotating motor 306 are powered by the power supply unit 204. As shown in FIG. 3, the upper hole is provided in the center of the annular rotating pallet module 103, so that the upper camera 303 can scan the QR code on the bottom of a shelf, thus determining the position of the shelf. The lower hole 203 is provided in the center of the base plate 305 of the frame, which facilitates to observe the QR code on the ground by the lower camera 304, thus determining the position of the robot. Three linear actuators 202 move up and down to perform the lifting and lowering of the annular pallet 107 having no influence on the camera for scanning the QR code.

The transfer robot enables self-positioning by means of a camera, which scans the QR code provided on the ground of the warehouse, to move freely in the warehouse in an automated way.

The transfer robot enables positioning of the shelves by means of a camera, which scans the QR code provided at the bottom of the shelves, to automatically search and identify the corresponding shelves, and to hand them accurately.

The shelves are lifted up and down by operating one or more linear actuators through the motor.

The shelves may rotate independently of the robot (i.e. the shelves may turn) by operating the annular rotating pallet module through the rotating motor.

The annular rotating pallet module 103 is operated by the rotating motor to correspond to the rotating speed of the driving motor 201, by this way, the robot body rotates while the shelves remain stationary (i.e. the robot can turn while lifting the shelves).

The robot may drive the shelves to rotate together through the driving motor 201.

The use of the barrier module 104 on the head of the frame allows for an emergency stop when a barrier is present, so as to ensure the safety of operation.

The transfer robot is further automated by utilizing an automatic charging module provided at a parking spot.

The foregoing is intended to be used as preferred embodiments of this disclosure, but is not limited thereto. Any modifications, equivalent substitutions and improvements within the spirit and principles of the disclosure fall within the scope as claimed.

What is claimed is:

1. A linear actuator-type automatic warehouse robot, comprising:
   a frame;
   universal wheels (101) and driving wheels (102) provided at a bottom of the frame, with the universal wheels (101) being located at four corners of the bottom of the frame and the driving wheels (102) being located at the middle of two opposite sides of the bottom of the frame;
   driving motors (201) provided on the frame and connected to the driving wheels (102) respectively;
   a barrier module (104) provided at a head of the frame;
   a rotating pallet module (103) provided at an upper portion of the frame;
   a rotating motor (306) provided within the rotating pallet module (103);
   linear actuators (202) provided on the frame and located at a bottom of the rotating pallet module (103);
   an upper hole (103a) provided on the rotating pallet module (103) and a lower hole (203) provided on a base plate (305);
   an upper camera (303) arranged below the upper hole (103a);
   a lower camera (304) arranged above the lower hole (203); and
   a power supply unit (204) provided in the frame.

2. The linear actuator-type automatic warehouse robot of claim 1, wherein an emergency switch (105) is provided on the head of the frame.

3. The linear actuator-type automatic warehouse robot of claim 1, wherein the power supply unit is an automatic charging module.

* * * * *